United States Patent [19]

Thörmer et al.

[11] 4,435,532
[45] Mar. 6, 1984

[54] USE OF ZINC SALTS OF MERCAPTOBENZIMIDAZOLE AND DITHIOPHOSPHORIC ACID ESTERS FOR THE PREPARATION OF NITRILE RUBBER/POLYVINYL CHLORIDE MIXTURES

[75] Inventors: Joachim Thörmer, Leverkusen; Hans H. Bertram, Leichlingen; Otto Benn, Bergisch Gladbach; Helmut Hurnik, Leverkusen, all of Fed. Rep. of Germany

[73] Assignee: Bayer Aktiengesellschaft, Leverkusen, Fed. Rep. of Germany

[21] Appl. No.: 392,529

[22] Filed: Jun. 28, 1982

[30] Foreign Application Priority Data

Jul. 4, 1981 [DE] Fed. Rep. of Germany ........ 3126402

[51] Int. Cl.³ .......................... C08K 5/04; C08K 5/34
[52] U.S. Cl. ................................... 524/92; 524/127; 524/525; 526/255; 526/331; 526/338; 526/343; 526/344; 526/345
[58] Field of Search ................................ 524/92, 127

[56] References Cited

U.S. PATENT DOCUMENTS

| 2,630,421 | 3/1953 | Stamatoff | 524/92 |
| 2,735,836 | 2/1956 | Fanning | 524/127 |
| 3,472,813 | 10/1969 | Hecker et al. | 524/127 |
| 4,244,848 | 1/1981 | Minagawa et al. | 524/127 |
| 4,355,126 | 10/1982 | Haaf et al. | 524/127 |

Primary Examiner—Harry Wong, Jr.
Attorney, Agent, or Firm—Connolly and Hutz

[57] ABSTRACT

Use of zinc salts of mercaptobenzimidazoles corresponding to the following general formula:

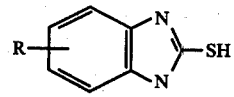

wherein
R represents hydrogen or a $C_1$–$C_4$ alkyl group; and/or a zinc salt of a di-$C_1$–$C_9$-alkyldithiophosphate for the preparation of nitrile rubber/PVC mixtures.

7 Claims, No Drawings

USE OF ZINC SALTS OF MERCAPTOBENZIMIDAZOLE AND DITHIOPHOSPHORIC ACID ESTERS FOR THE PREPARATION OF NITRILE RUBBER/POLYVINYL CHLORIDE MIXTURES

The preparation of polymer mixtures of butadiene/acrylonitrile copolymers (hereinafter referred to as "NBR") and polyvinyl chloride (hereinafter referred to as "PVC") or copolymers thereof is known and was first described by E. KONRAD in the Journal "Gummi" No. 13 (1936) and has also been described by Bacon and co-workers in "Proceedings of the Rubber Technology Conference 1938" (pages 525–536). The technical literature cited below deals with the preparation and application of such polymer mixtures which are used both in the uncross-linked state as elastomers (T. J. Sharp, J. A. Ross, Transactions of the Rubber Industry, Vol. 37, No. 5, October 1961; C. L. Bryant, Lecture before the Deutsche Kautschukgesellschaft 4th–8th Oct. 1960, Berlin; K. A. Pedley, Polymer Age, Vol. 1, No. 3, May 1970, pages 97 et seq; T. J. Sharp, British Plastics, 1959, page 431; C. Y. Almond, Transactions of the Institution of the Rubber Industry 37, 1961, pages 85–95).

Polymer mixtures of the type mentioned above have two main fields of application:

(a) in the uncross-linked state, as thermoplastic materials in which one component (NBR) functions as a migration-resistant polymer plasticizer which is difficult to extract and renders the product impact resistant, while PVC is in most cases the quantitatively predominant component; and (b) in the cross-linked state, as elastomer in which one component (PVC) serves to improve the resistance to ozone and weathering and the resistance to swelling in the presence of mineral oils and fuels and to improve the fire characteristics, while NBR constitutes the cross-linkable component which is in most cases quantitatively predominant.

The following are mentioned as examples of application of (a): Abrasion-resistant, oil-resistant footwear, bellows, sleeves and tubes for the motor vehicle and other technical industry, coatings for melt roller calenders for the clothing, upholstery, leatherwear and shoe industry and for foils such as foamed and buffed foils for producing velours effects for the clothing industry (resistant to chemical dry cleaning).

The following are examples of application of (b): Light-colour and black vulcanizates produced by known methods of the rubber and cable industry, e.g. pressure rollers for graphic fabrics, tubes and pipes of all types with strengthening supports (with or without reinforcements) for contact with fuel and oil in the motor vehicle and machine industry, foils with or without reinforcements for technological and leisure industries (e.g. pneumatic boats and dinghies, cellular articles of all types, e.g. for heat and cold insulation, as insulations and sheaths for cables, accessories for the spinning industry and conveyor belts. All applications of this type make use of the advantage of the excellent ozone and weathering resistance of the polymer mixtures.

To obtain a homogeneous polymer mixture, the NBR and PVC are mixed together either as solid polymers or in the form of dispersions (latices). When latex mixtures are used, which naturally provide excellent preliminary subdivision and distribution, the components first coagulate and are then worked-up to the solid polymer mixture by conventional methods.

In both cases, the formation of a homogeneous polymer phase (complete mutual solubility of the polymers) requires the components to be mechanically mixed at a temperature above the glass transition temperature of PVC ("gelling"). Regardless to the extent to which the NBR used (as solid or latex) has undergone preliminary stabilization, this process of perfect gelling requires heat stabilization of the PVC in order to prevent the splitting off of hydrogen chloride and ensure that light-coloured polymer mixtures undamaged by heat may be obtained.

It is also known that although the conventional substances which are effective as PVC stabilizers, such as barium/cadmium salts of organic fatty acids, organic tin compounds, calcium/zinc salts or organic fatty acids and the known types of lead compounds are effective as heat stabilizers for these NBR/PVC mixtures, they have certain disadvantages as regards subsequent working-up and application of such NBR/PVC mixtures.

Those stabilizers which are readily hydrolysed as emulsions or dispersions in the weakly alkaline latex phase have general disadvantages when used in latex mixtures. Hydrolysis causes them to lose effectiveness and they contaminate the effluent as partially or completely saponified compounds.

The known stabilizers also have the following disadvantages;

(a) In the case of barium/cadmium salts of organic fatty acids, dispersibility in the quantities necessary for latex mixtures is problematic. Above all, the vulcanization characteristics are adversely affected in the field of elastomers and the processing qualities of hard rubber mixtures are thereby impaired. Moreover, there is some doubt as to the toxicological properties of these stabilizers and in the presence of vulcanization systems containing sulphur it is not possible to avoid discolourations, e.g. by cadmium.

(b) Although organic tin compounds are highly effective in small doses, they impair the processing characteristics of the rubber mixtures by a powerful acceleration of the vulcanization reaction. The most serious disadvantage thereof, however, lies in the instability and susceptibility to hydrolysis thereof when used in the latex process in which the stabilizer must be added in an emulsified or dispersed state before coagulation takes place.

(c) Calcium/zinc salts of organic fatty acids have the disadvantage of comparatively low activity; they also result in discoloured and therefore undesirable polymer mixtures, especially in the case of latex mixtures.

(d) Lead compounds are not applicable in all cases since they are very liable to cause discolouration in light coloured vulcanizates in the presence of sulphur (component in the vulcanization system).

It has now been found that the disadvantage of the conventional stabilizers described above may be avoided by using zinc salts of mercaptobenzimidazoles corresponding to the following general formula:

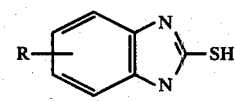

wherein

R represents hydrogen or a $C_1$-$C_4$, preferably $C_1$-alkyl group and/or zinc salts of di-$C_1$-$C_9$-alkyl-dithiophosphates as heat stabilizers.

It has surprisingly been found that, when these compounds are used as heat stabilizers for gelling for polymer mixtures, as little as 1%, by weight, thereof (based on the polymer mixture) provides perfectly adequate stabilization for the gelling process and results in a very lightly coloured polymer mixture. The compounds were found to have little or no influence on the vulcanization characteristics and processing qualities of the rubber mixtures. As further technical advantage compared, for example, with organo-tin compounds, they were found to have excellent resistance to hydrolysis, so that they may advantageously be used as heat stabilizers for the latex process. The preparation of dispersions from these compounds provides no difficulty and even prolonged storage of the stabilized latex mixtures is not found to lead to deposition of the stabilizer such as is observed in other compounds mentioned above which are based on heavy metals.

Among the zinc salts of mercaptobenzimidazoles and of dialkyldithiophosphates, the following are preferred:

zinc salt of 2-mercaptobenzimidazole, zinc salt of 4- or 5-methyl-2-mercaptobenzimidazole and zinc salt of diethyldithiophosphate.

The zinc salts of mercaptobenzimidazoles or dialkylphosphates which may be used according to the present invention are generally added in quantities of from 0.2 to 1%, by weight, preferably from 0.4 to 0.6%, by weight, based on the solids content of the NBR/PVC polymer mixture.

The NBR/PVC polymer mixture generally contains from 5 to 80%, by weight, preferably from 8 to 70%, by weight, of a butadiene/acrylonitrile rubber which in turn generally contains from 12 to 48%, by weight, preferably from 20 to 38%, by weight of polymerised acrylonitrile.

The NBR rubber generally has a Mooney viscosity (100° C.) of from 10 to 140, in particular from 25 to 60, but may also be used in liquid form.

The term "PVC" is used herein to denote not only polyvinyl chloride, but also copolymers thereof, such as copolymers with vinylidene chloride, vinyl acetate, ethylene, propylene, isobutylene or vinylidine fluoride.

The PVC polymers preferably have a K-value of from 50 to 90, in particular from 55 to 75.

The compounds used according to the present invention are preferably added to the latex mixtures of NBR and PVC. The mixture is worked up to a solid polymer mixture in the conventional manner and may be gelled at from 120° to 190° C., preferably from 150° to 170° C., to form a homogeneous polymer phase.

The stabilized polymer mixture may contain the conventional additives, such as synthetic plasticizers based on esters, ethers or thioethers, lubricants, antiblocking agents, light stabilizers, fillers, flame retarders, cross-linking agents such as sulphur, and accelerators. The mixtures may also contain co-agents for cross-linking by peroxides and high energy radiation, such as mono- or poly-functional unsaturated esters of (meth)acrylic acids or alkyl esters of di-, tri- and oligo-carboxylic acids, as well as trialkyl cyanurates or trialkylisocyanurates, 1,2-polybutadienes and bis-maleic imides. The peroxides used may be dialkyl or diaryl peroxides, peroxyesters or peroxyethers.

EXAMPLE 1

A latex mixture is prepared from the following components with stirring:

(A) A polyvinyl chloride latex prepared by the conventional emulsion process. The PVC has a K-value of 65 according to Fikentscher and is obtained by the known methods employed by PVC manufacturers.

(B) An emulsion copolymer of 34% by weight acrylonitrile and 66% by weight butadiene of the type obtained commercially from the manufacture of nitrile rubber (degasified, stopped and stabilized against atmospheric oxygen). The nitrile rubber has a Mooney viscosity of 42 ME. The proportion of A:B is 35:65 kg, based on the solids, content. The latices may have a solids content of from 15 to 60%, by weight.

One of the present stabilizers is added to this latex mixture with stirring in the form of a suspension C for the subsequent gelling process and is finely divided therein.

Suspension C is prepared by stirring and contains 6 kg of the potassium salt of coconut fatty acid in 30 liters of deionized water, in which 0.4 kg of finely ground zinc salt of 2-mercaptobenzimidazole is dispersed.

The stabilized latex mixture is worked-up by the conventional methods of coagulation with electrolytes, such as sodium chloride dissolved in water at from 40° to 60° C., washing and drying of the solid substance. The mixture is then gelled on a roller or in a gelling extruder by the known gelling process at a temperature of 160° C. for 10 minutes. A homogeneous, colourless to light beige, gel-free rubber having a Defo hardness of approximately 8000 is obtained on cooling.

In a rubber test mixture of

| |
|---|
| 100 parts of the polymer mixture |
| 0.5 parts of stearic acid |
| 5 parts of zinc oxide |
| 40 parts of HAF carbon black |
| 5 parts of a tackifying agent[1] |
| 0.9 parts of a sulphenamide accelerator[2] |
| 1.5 parts of sulphur |

[1] the substance used was "Vulkanol FH" manufactured by BAYER AG, Leverkusen
[2] the substance used was "Vulkacit CZ" manufactured by BAYER AG, Leverkusen all parts being by weight.

A mixture prepared by this method is found to have a Mooney-Scorch at 120° C. (Ms/t$_5$) of 47 minutes. The method of preparation of the mixture is described in "Handbuch für die Gummi-industrie" on page 97 (published by BAYER AG).

If, in the above-mentioned formulation, a light coloured filler is used instead of the HAF carbon black, e.g. 30 parts of a precipitated silicate, the vulcanizate obtained is light in colour without discolourations.

EXAMPLE 2

The method is the same as described in Example 1, but using 0.4 kg of the zinc salt of 4-methyl-2-mercaptobenzimidazole as stabilizer for the polyvinyl chloride constituent (in commercial products, zinc salts of mixtures of 4- and 5-methyl-mercaptobeizimidazole are normally used).

The result obtained is virtually the same as in Example 1. The Mooney-Scorch of the carbon black mixture is 46 minutes.

EXAMPLE 3 (COMPARISON EXAMPLE)

The method is the same as in Example 1, but using 0.4 kg of a commercial PVC stabilizer based on dibutyl-tin-dithioglycollic esters. The product obtained is just as light in colour and gel-free as that described in Example 1, but the scorch times of the rubber mixtures obtained from it fluctuate widely due to partial saponification of the stabilizer. Values of 35 minutes, for example, are obtained for the MS/$t_5$ at 120° C. and when the experiment is repeated, an end product is obtained which produces a scorch time according to Mooney (MS/$t_5$) of 67 minutes at 120° C. in the rubber mixture.

EXAMPLE 4 (COMPARISON EXAMPLE)

The method is the same as in Example 1 and the zinc salt of 2-mercaptobenzothiazole (0.4 kg) is used as heat stabilizer. Although the rubber obtained is gel-free and very light in colour, it has the very low scorch time according to Mooney (MS/$t_5$) at 120° C. of 8 minutes. This class of compounds is unusable due to its powerfully accelerating effect on vulcanization since it restricts the possibility of processing the product and does not provide the necessary reliability in operation.

EXAMPLE 5

The method is the same as in Example 1, but the heat stabilizer used is a suspension prepared with stirring as described under C, containing 0.4 kg of the zinc salt of diethyldithiophosphate. The product obtained after working-up and gelling (10 minutes 160° C.) is again a homogeneous, light coloured polymer mixture similar in properties to the mixture described in Example 1. The Mooney-Scorch time is 50 minutes.

Vulcanizates containing clear fillers, for example 30 parts of a precipitated silicate, are not discoloured.

EXAMPLE 6

A latex mixture is prepared in a manner analogous to Example 1, but the proportions of solids are adjusted to 30 parts, by weight, of PVC and 70 parts, by weight, of a nitrile rubber having an acrylonitrile content of 28% by weight (Mooney viscosity 36 ME). A suspension of 0.4 kg of the zinc salt of 2-mercaptobenzimidazole is intimately mixed with the latex mixture in the same manner as described in Example 1 and coagulated, washed and dried. Gelling is carried out in known manner for 10 minutes at 160° C. The product obtained after cooling in water is a solid rubber having a Defo hardness of from 5000 to 8000 and a Mooney viscosity of 74 ME. The material is pale beige and homogeneous and is found to have no gel content in cyclohexane in the ultracentrifuge.

Effects of the chemical substances used on the Mooney-Scorch times of the carbon black mixtures (see test mixtures on page 8):

| Example | Chemical compound | Colour of mixture | Mooney-Scorch time (min) |
|---|---|---|---|
| 1 | Zinc salt of 2-mercaptobenzimidazole | yellow | 47 |
| 2 | Zinc salt of 4-methyl-2-mercaptobenzimidazole | pale yellow | 46 |
| 3 | Dibutyl tin dithioglycolate ester | pale yellow | 35 to 67 |
| 4 | Zinc salt of 2-mercaptobenzothiazole | yellow | 8 |
| 5 | Zinc salt of diethyl-dithiophosphate | yellow | 50 |
| 6 | Zinc salt of 2-mercaptobenzimidazole | yellow | 44 |

We claim:

1. A process for stabilizing a mixture of (A) a copolymer of butadiene and acrylonitrile and (B) polyvinyl chloride or a copolymer of vinyl chloride and vinylidine chloride, vinyl acetate, ethylene, propylene, isobutylene or vinylidine fluoride which comprises adding to said mixture a stabilizing amount of (I) a zinc salt of a mercaptobenzimidazole of the formula

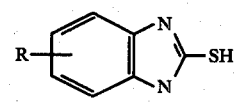

wherein
R is hydrogen or alkyl having 1 to 4 carbon atoms,
(II) a zinc salt of di-$C_1$-$C_9$-alkyldithiophosphate or
(III) a mixture thereof.

2. The process of claim 1 wherein said stabilizing amount is from 0.2 to 1%, by weight, based on the solids content of said mixture.

3. The process of claim 1 wherein said stabilizing amount is from 0.4 to 0.6% by weight, based on the solids content of said mixture.

4. The process of claim 1 wherein (I)–(III) is selected from the group consisting of 2-mercapto-benzimidazole, 4-methyl-2-mercaptobenzimidazole, 5-methyl-2-mercaptobenzimidazole, diethyldithiophosphate and mixtures thereof.

5. The process of claim 1 wherein said mixture contains from 5 to 80%, by weight, of said copolymer of butadiene and acrylonitrile which has an acrylonitrile content of from 12 to 48%, by weight.

6. The process of claim 1 wherein said copolymer of butadiene and acrylonitrile has a Mooney viscosity at 100° C. of from 10 to 140.

7. The process of claim 1 wherein said polyvinyl chloride or copolymer thereof has a K-value of from 50 to 90.

* * * * *